United States Patent
Lee et al.

(10) Patent No.: US 6,535,380 B1
(45) Date of Patent: Mar. 18, 2003

(54) PORTABLE COMPUTER WITH AN UNLATCHING MEMBER MOVABLE IN EITHER OF TWO OPPOSITE DIRECTIONS TO PERMIT OPENING OF A COMPUTER LID

(75) Inventors: Chuan-Yuan Lee, Taipei (TW); Hsi-Ta Wang, Taipei (TW)

(73) Assignee: Compal Electronics, Inc., Taipei (TW)

(*) Notice: Subject to any disclaimer, the term of this patent is extended or adjusted under 35 U.S.C. 154(b) by 214 days.

(21) Appl. No.: 09/636,218

(22) Filed: Aug. 10, 2000

(51) Int. Cl.⁷ .............................. G06F 1/16; H05K 5/03
(52) U.S. Cl. .................. 361/683; 361/680; 361/681; 292/8; 292/56
(58) Field of Search ................................. 361/680–683; 345/167–179; 292/8, 56, 42, 145, 95

(56) References Cited

U.S. PATENT DOCUMENTS 4,901,261 A * 2/1990 Fuhs .......................... 361/681
5,379,182 A * 1/1995 Fujimori et al. ............ 361/681
5,465,191 A * 11/1995 Nomura et al. ............. 361/681
5,497,296 A * 3/1996 Satou et al. ................. 361/681
6,108,196 A * 8/2000 Jung .......................... 361/683
6,115,239 A * 9/2000 Kim ........................... 361/681

* cited by examiner

*Primary Examiner*—Lynn D. Feild
*Assistant Examiner*—Lisa Lea -Edmonds
(74) *Attorney, Agent, or Firm*—Pillsbury Winthrop, LLP

(57) ABSTRACT

A portable computer includes a keyboard unit that is formed with two latch retaining notches, and a lid that is mounted pivotally on the keyboard unit for covering the keyboard unit. Two spring-biased latch members are disposed movably on the lid, and engage the retaining notches, respectively. Whether an unlatching member is moved on the lid in a first direction or a second direction that is opposite to the first direction, the latch members move on the lid in the first direction so as to disengage the latch members from the retaining notches, thus permitting movement of the lid for uncovering the keyboard unit. As such, the unlatching member can be operated easily by left-handed or right-handed people in order to open the lid.

5 Claims, 8 Drawing Sheets

PORTABLE COMPUTER WITH AN UNLATCHING MEMBER MOVABLE IN EITHER OF TWO OPPOSITE DIRECTIONS TO PERMIT OPENING OF A COMPUTER LID

BACKGROUND OF THE INVENTION

1. Field of the Invention

This invention relates to a portable computer, more particularly to a portable computer which has an unlatching member that can be moved on a lid in either of two opposite directions to permit opening of the lid.

2. Description of the Related Art

Referring to FIG. 1, a conventional portable computer 1, such as a notebook computer, is shown to include an unlatching member 10 which is disposed movably on a computer lid 11 and which has to be moved on the lid 11 in only one direction just before the lid 11 is opened. As a result, in a situation where the unlatching member 10 is designed for left-handed people, it is somewhat difficult for a right-handed person to operate the unlatching member 10, and vice versa.

SUMMARY OF THE INVENTION

The object of this invention is to provide a portable computer which has an unlatching member that can be moved on a lid in either of two opposite directions to permit opening of the lid, thereby enabling both of left-handed and right-handed people to operate the same easily. According to this invention, a portable computer includes a keyboard unit that is formed with two latch retaining notches, and a lid that is mounted pivotally on the keyboard unit for covering the keyboard unit. Two spring-biased latch members are disposed movably on the lid to engage the retaining notches, respectively. Whether an unlatching member is moved on the lid in a first direction or a second direction that is opposite to the first direction, the latch members move on the lid in the first direction so as to disengage the latch members from the retaining notches, thus permitting movement of the lid for uncovering the keyboard unit. As such, the unlatching member can be operated easily by left-handed or right-handed people in order to open the lid.

BRIEF DESCRIPTION OF THE PREFERRED EMBODIMENT

These and other features and advantages of this invention will become apparent in the following detailed description of the preferred embodiments of this invention, with reference to the accompanying drawings, in which.

Figure 7:
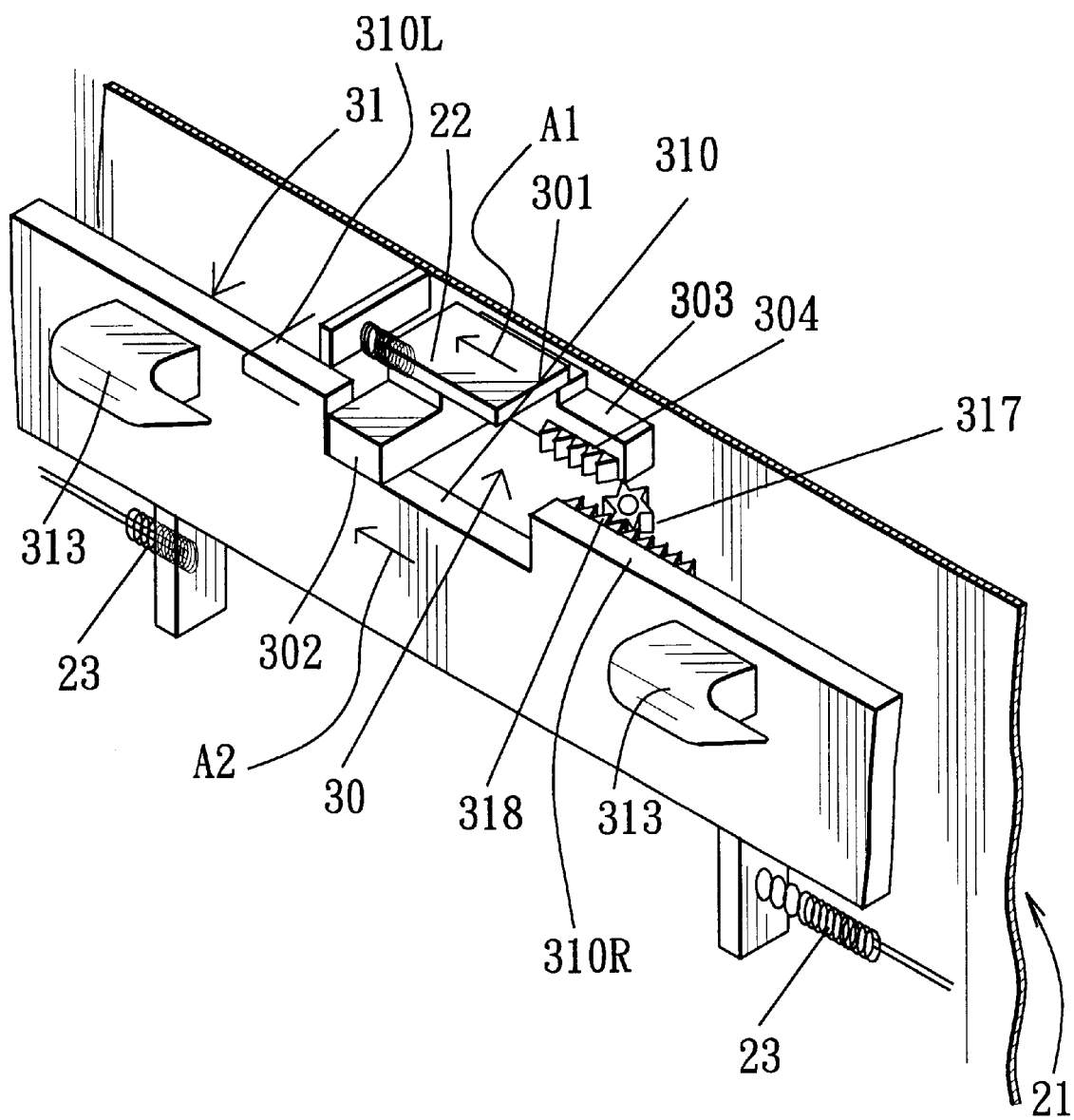
Figure 8:
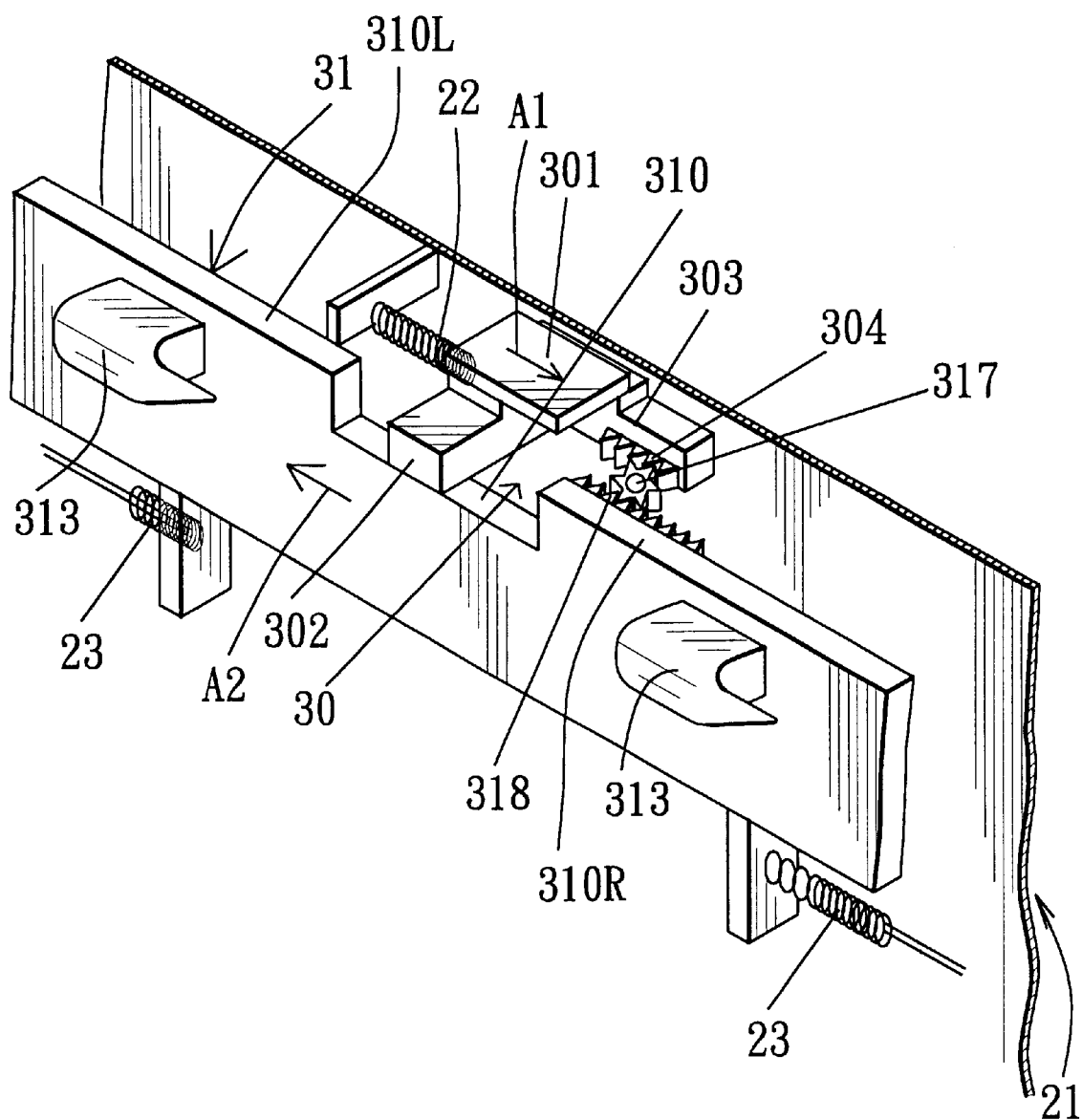

FIG. 7 is a fragmentary perspective view of the lid of the second preferred embodiment, illustrating how an unlatching member and either of two latch members are moved on the lid in the same direction; and FIG. 8 is a schematic fragmentary perspective view of the lid of the second preferred embodiment, illustrating how the unlatching member and either of the latch members are moved on the lid in opposite directions.

DETAILED DESCRIPTION OF THE PREFERRED EMBODIMENTS

Before the embodiments are described in detail, it is noted that similar elements or structures are designated by like reference numbers or characters throughout the detailed description.

Figure 1:
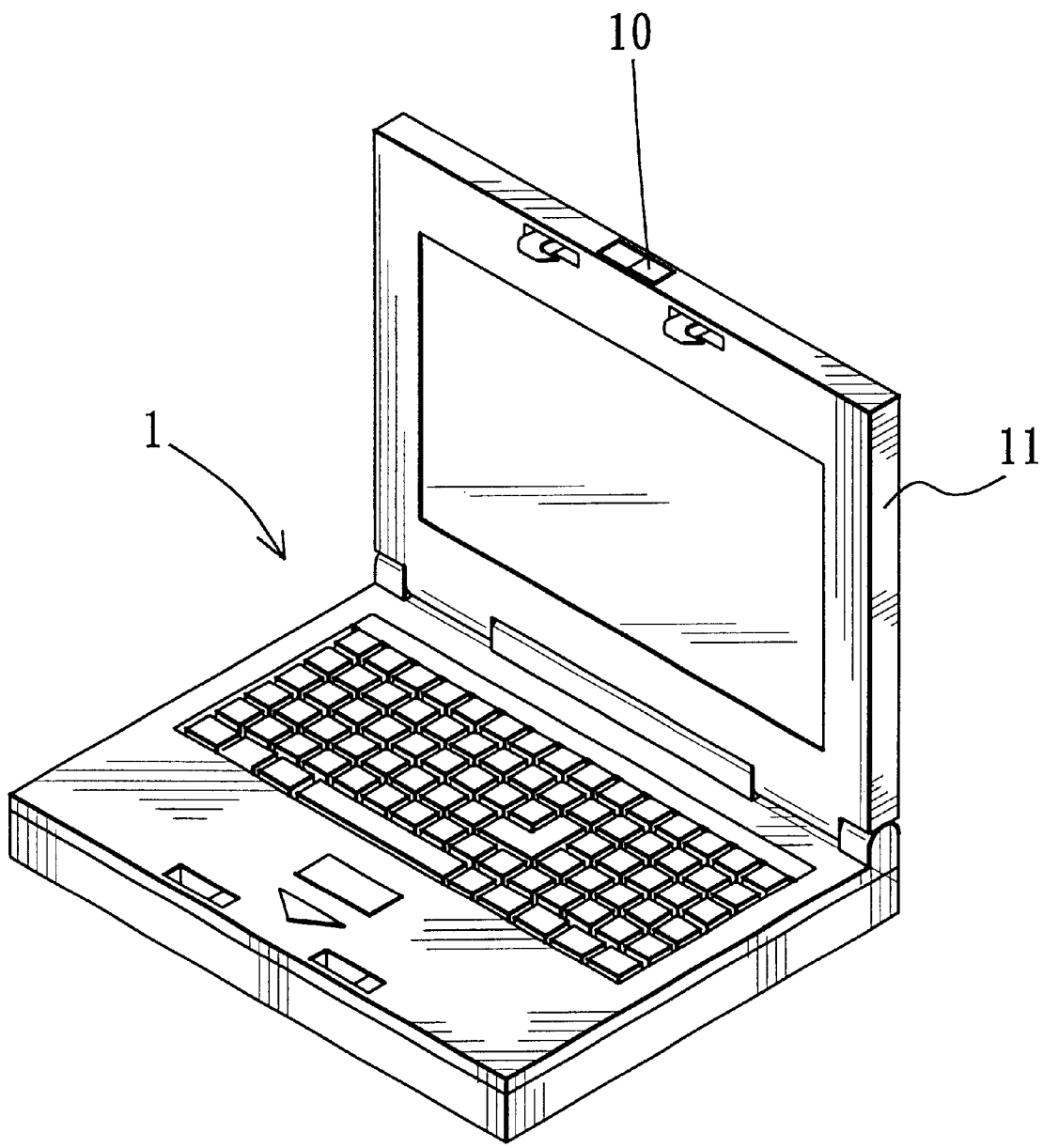
FIG. 1 is a perspective view of a conventional portable computer.
Figure 2:
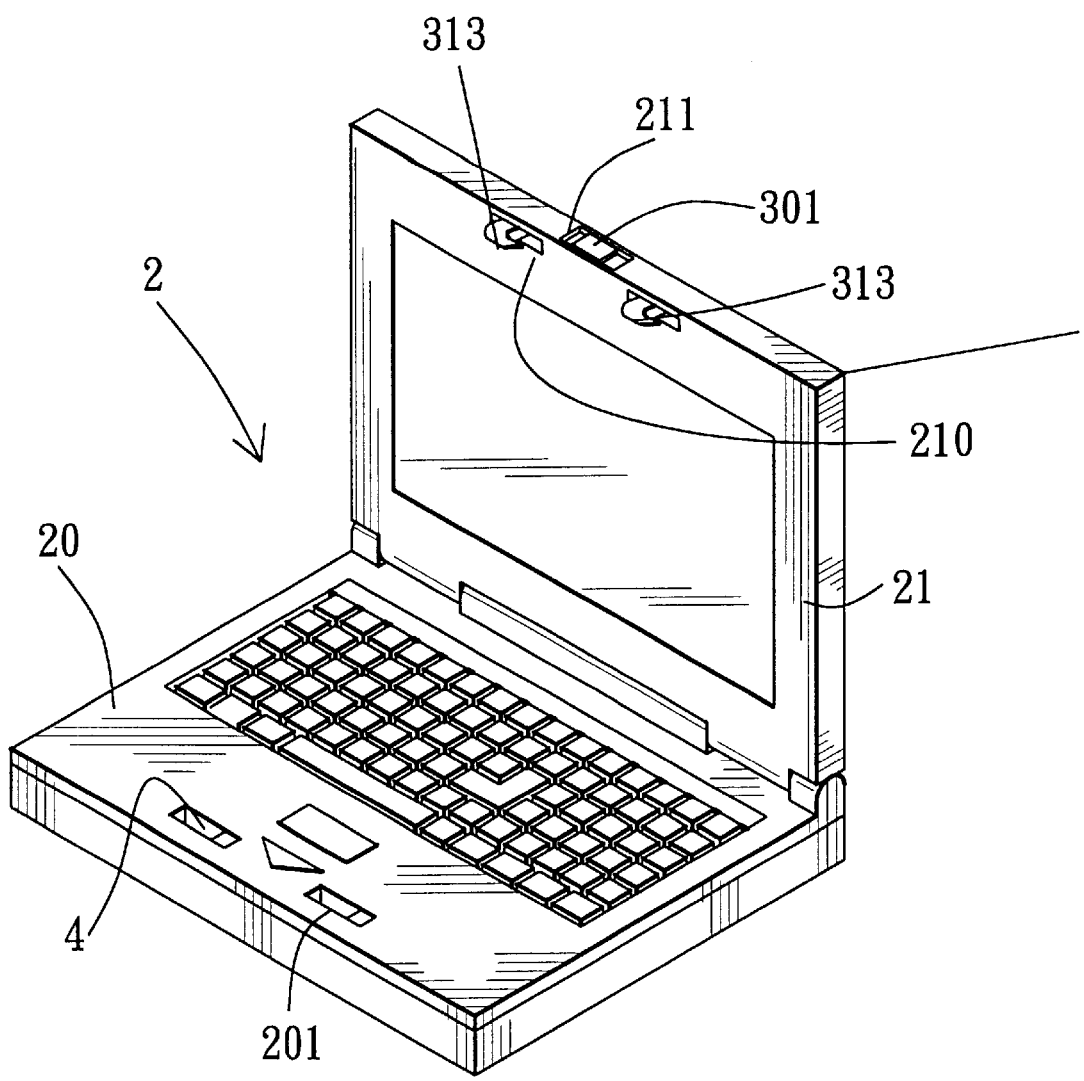
FIG. 2 is a perspective view of a first preferred embodiment of a portable computer according to this invention.
Figure 2A:
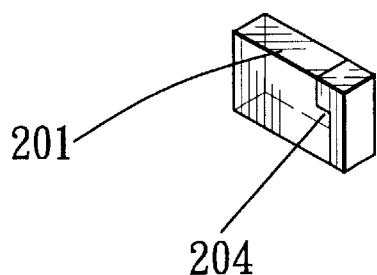
FIG. 2A is a schematic view illustrating how a latch retaining notch is formed in a latch hole in a keyboard unit of the first preferred embodiment.
Figure 3:
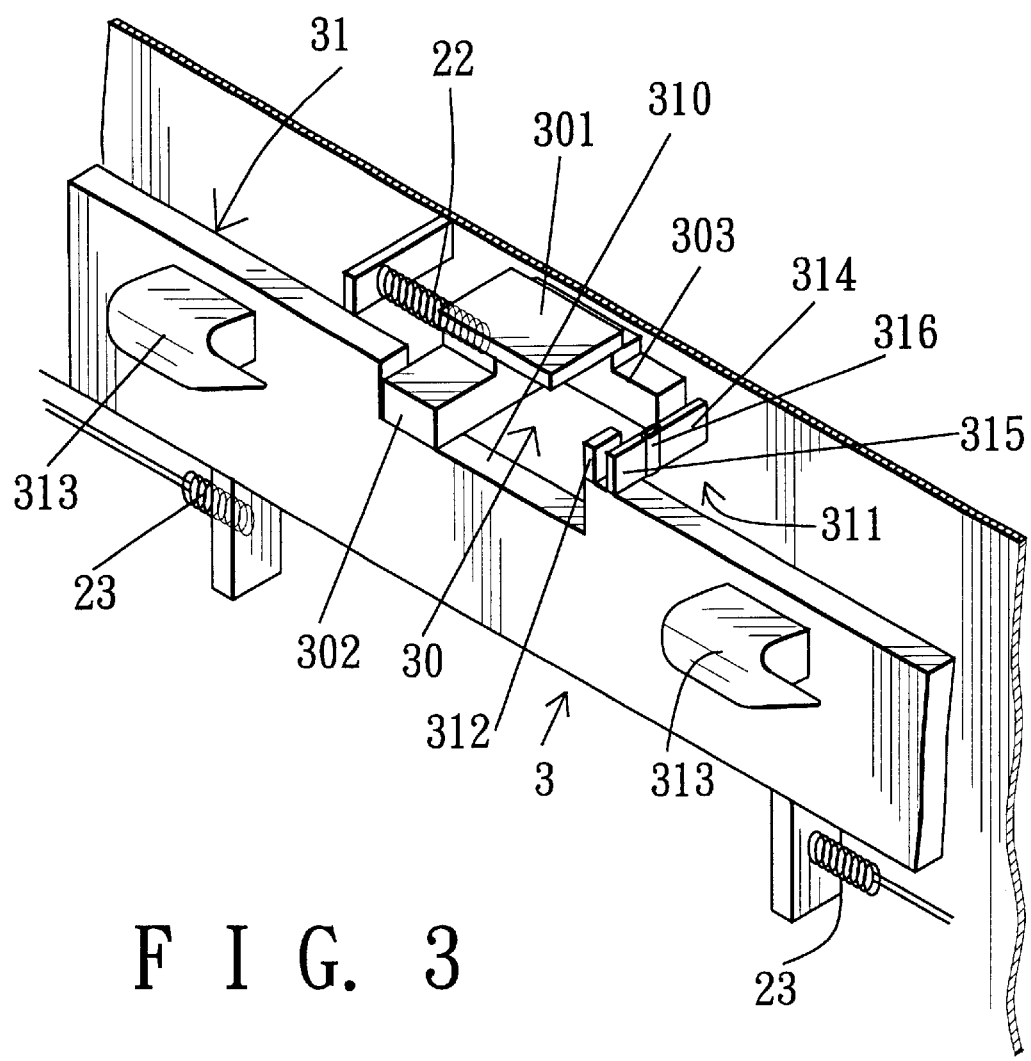
FIG. 3 is a fragmentary perspective view of a lid of the first preferred embodiment, illustrating the relationship between an unlatching member and two latch members.

Referring to FIGS. 2, and 3, a first preferred embodiment of a portable computer 2, such as a notebook computer, according to this invention is shown to include a keyboard unit 20, a computer lid 21 and an opening unit 3. The keyboard unit 20 has two latch engagement portions 4, each of which is formed with a latch hole 201 and a latch retaining notch 204 (see FIG. 2A) that is communicated with the latch hole 201. The lid 21 is mounted pivotally on the keyboard unit 20 for covering the same, and includes two latch members 313 that are disposed movably on the lid 21. The latch members 313 are urged by two latch positioning springs 23 to engage the retaining notches 204, respectively. The latch members 313 extend respectively from two first openings 210 in the lid 21.

An unlatching member 30 is disposed movably on the lid 21, and is capable of being moved on the lid 21 so as to disengage the latch members 313 from the retaining notches 204, thereby permitting movement of the lid 21 to an open position for uncovering the keyboard unit 20.

Figure 4:
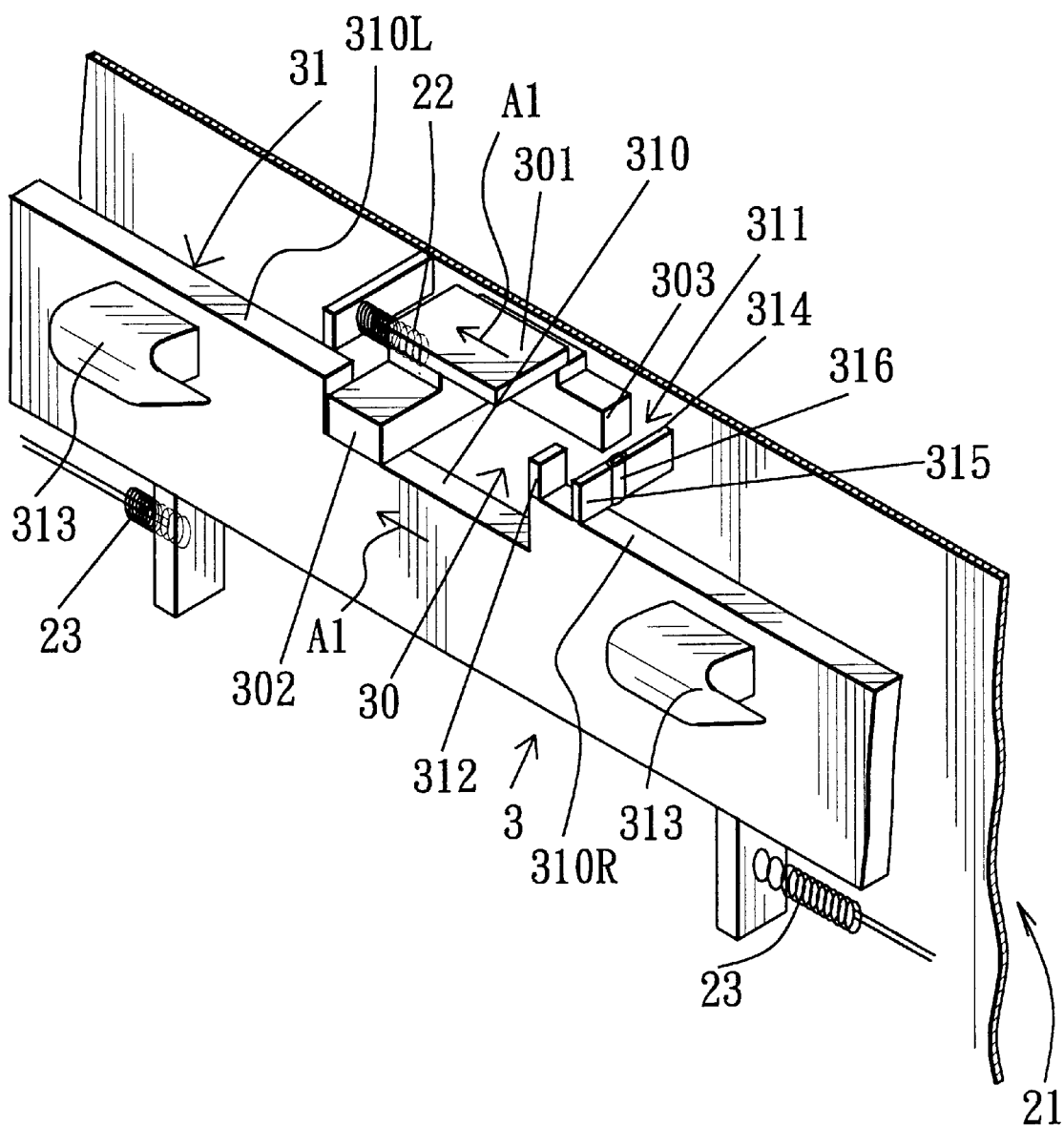
FIG. 4 is a fragmentary perspective view of the lid of the first preferred embodiment, illustrating how the unlatching member and either of the latch members are moved on the lid in the same direction.
Figure 5:
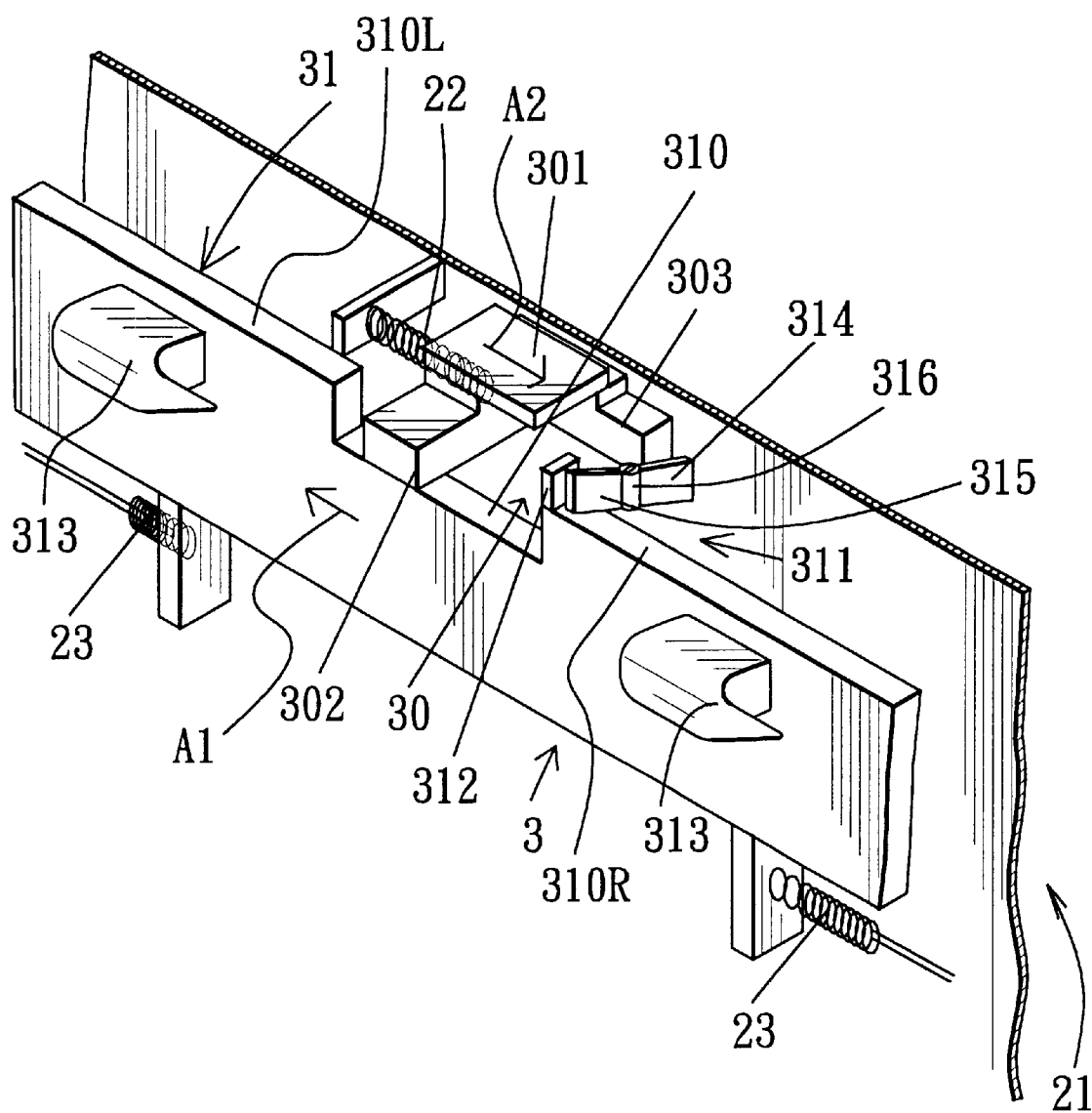
FIG. 5 is a fragmentary perspective view of the lid of the first preferred embodiment, illustrating how the unlatching member and either of the latch members are moved on the lid in opposite e directions.

A driven plate 31 is mounted movably on the lid 21, and is guided to move in first or second directions, as shown by arrowheads (A1, A2) in FIGS. 4 and 5. The latch members 313 are mounted fixedly on the driven plate 31. The driven plate 31 has a first engagement portion and a second engagement portion. In this embodiment, the first engagement portion is constituted by a left projection (310L). The driven plate 31 further has a right projection (310R) which is aligned with the left projection (310L) and which defines a slide slot 310 between the left and right projections (310L, 310R). The second engagement portion is constituted by a tongue 312 that is formed on a left end of the right projection (310R).

The unlatching member 30 has an actuator 301 that is exposed outwardly from a second opening 211 in the lid 21 and that is adapted to be pushed by a user, a first driving portion 302 which extends from the actuator 301 in a direction that is perpendicular to the first and second directions (A1, A2) (see FIGS. 4 and 5), and a second driving portion 303 which extends from the actuator 301 in the second direction (A2) (see FIG. 5). The first driving portion 302 is received slidably in the slide slot 310 in the driven plate 31.

Figure 3A:
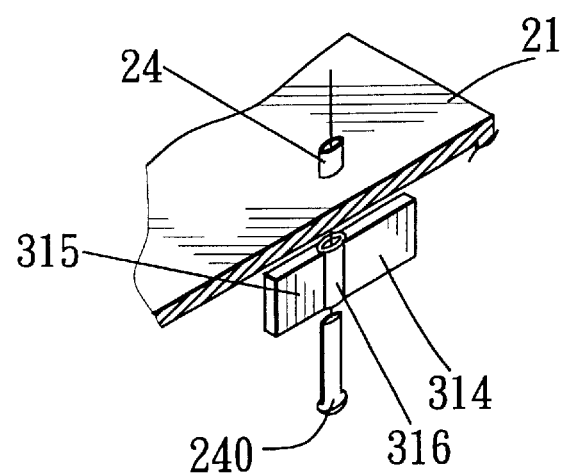
FIG. 3A is an exploded view illustrating how a push plate is mounted on the lid of the first preferred embodiment.

A driving member 311 is mounted rotatably on the lid 21, and is disposed between the unlatching member 30 and the driven plate 31. Referring to FIGS. 3 and 3A, in this embodiment, the driving member 311 includes a push plate which has a first plate portion 314, a second plate portion 315, and a middle hole 316 that is formed between the first and second plate portions 314, 315, and a pivot pin 240 which extends through the middle hole 316 in the push plate and which is journalled on a bearing member 24 that is attached to the lid 21.

A positioning spring 22 biases the unlatching member 30 to a predetermined position on the lid 21, which is located in a left end of the slide slot 310 in the driven plate 31.

Referring to FIG. 4, when the actuator 301 is actuated to move on the lid 21 in the first direction (A1), the first driving portion 302 engages and moves the left projection (310L) in the first direction (A1).

Referring to FIG. 5, when the actuator 301 is actuated to move on the lid 21 in the second direction (A2), the second driving portion 303 engages and rotates the first plate portion 314 so that the second plate portion 315 engages and moves the tongue 312 and the driven plate 31 in the first direction (A1). The second driving portion 303 of the unlatching member 30, the driving member 311, and the tongue 312 of the driven plate 31 constitute a direction reversing mechanism, which is disposed between the unlatching member 30 and the driven plate 31 so as to enable rotation of said unlatching member 30 and either of the latch members 313 in opposite directions.

Accordingly, in a case where the lid 21 is closed, whether the unlatching member 30 is moved on the lid 21 in the first or second directions (A1, A2) (see FIGS. 4 and 5), the latch members 313 move on the lid 21 in the first direction (A1) to disengage from the retaining notches 204 (see FIG. 2A), thereby permitting opening of the lid 21.

Figure 6:
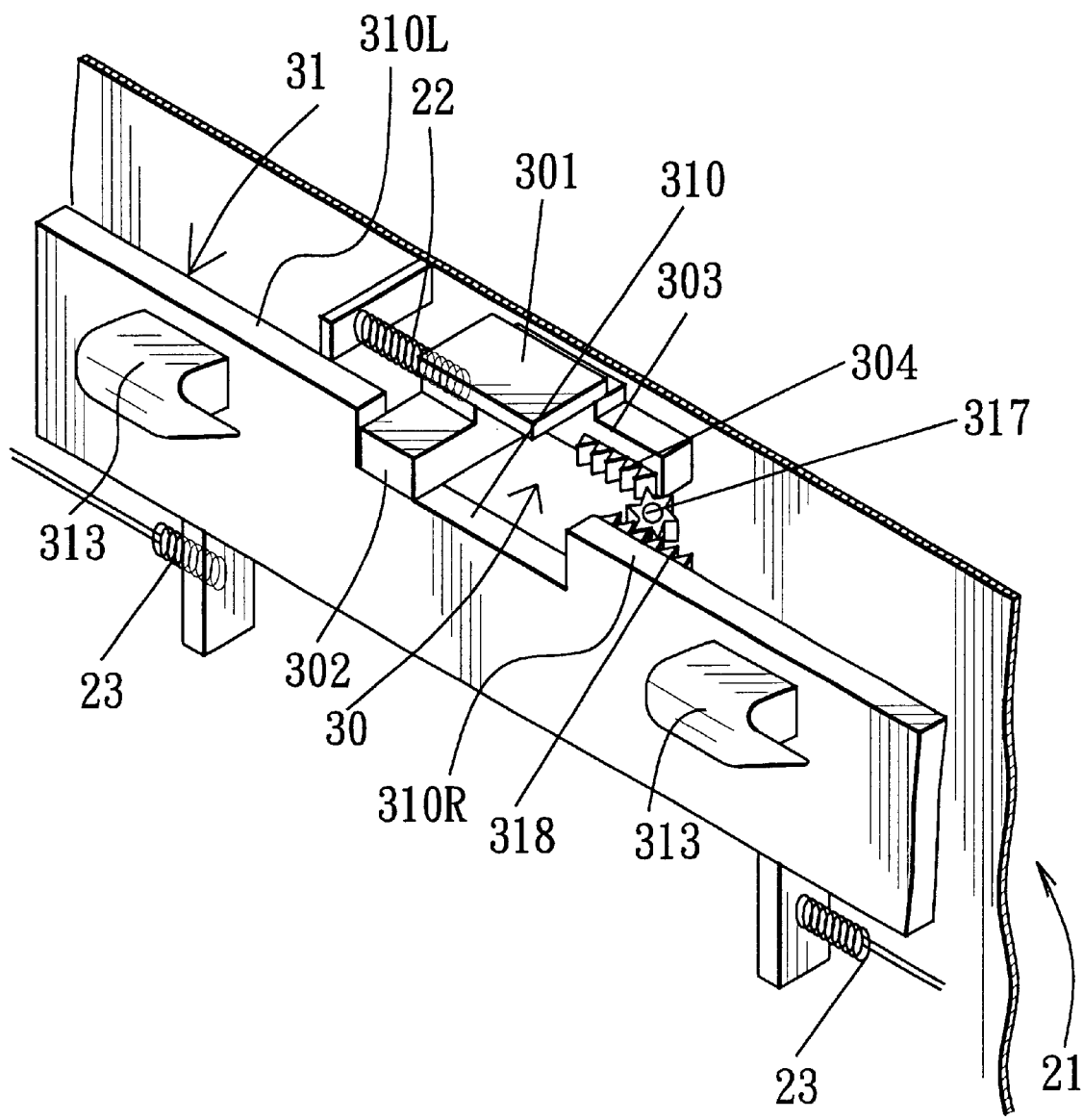
FIG. 6 is a fragmentary perspective view of a lid of a second preferred embodiment of a portable computer according to this invention.

Referring to FIG. 6, the direction reversing mechanism can be modified to include a first racked portion 318 that is formed on the right projection (310R) of the driven plate 31, a pinion 317 that is disposed rotatably on the lid 21 and that engages the first racked portion 318, and a second racked portion 304 that is formed on the second driving portion 303 of the unlatching member 30. The pinion 317 is spaced apart from the second racked portion 304 of the unlatching member 30.

Referring to FIG. 7, when the unlatching member 30 is moved on the lid 21 in the first direction (A1), the left projection (310L) of the driven plate 31 is pushed by the first driving portion 302 in the first direction (A1) in the same manner as the first embodiment.

Referring to FIG. 8, when the unlatching member 30 is moved on the lid 21 in the second direction (A2), the second racked portion 304 engages and rotates the pinion 317 so as to move the first racked portion 318 and the driven plate 31 in the first direction (A1).

With this invention thus explained, it is apparent that numerous modifications and variations can be made without departing from the scope and spirit of this invention. It is therefore intended that this invention be limited only as indicated by the appended claims.

We claim:

1. A portable computer including:
   a keyboard unit formed with two latch retaining notches;
   a lid mounted pivotally on said keyboard unit for covering said keyboard unit;
   two spring-biased latch members disposed movably on said lid to engage said retaining notches, respectively; and
   an unlatching member disposed movably on said lid and capable of being moved on said lid so as to disengage said latch members from said retaining notches, thereby permitting movement of said lid for uncovering said keyboard unit;
   wherein the improvement comprises said unlatching member being connected to said latch members so that, when said unlatching member moves on said lid in either of a first direction and a second direction that is opposite to said first direction, said latch members move on said lid in said first direction, thereby disengaging said latch members from said retaining notches, wherein said unlatching member has a first driving portion and a second driving portion, said computer further including:
   a driven plate disposed movably on said lid and guided to move in either of said first and second directions, said latch members being mounted fixedly on said driven plate, said driven plate having a first engagement portion and a second engagement portion; and
   a driving member mounted rotatably on said lid and disposed between said second driving portion of said unlatching member and said second engagement portion of said driven plate, movement of said unlatching members on said lid in said first direction causing said first driving portion of said unlatching member to engage and move said first engagement portion of said driven plate on said lid in said first direction, movement of said unlatching member on said lid in said second direction causing said second driving portion of said unlatching member to engage and rotate said driving member so that said driving member engages and moves said second engagement portion of said driven plate on said lid in said first direction.

2. The portable computer as claimed in claim 1, wherein said driven plate has a left projection which constitutes said first engagement portion, and a right projection which define a slide slot between said left and right projections and which is formed with a tongue that constitutes said second engagement portion, said unlatching member having an actuator that is exposed outwardly from said lid and that is adapted to be pushed by a user, said first driving portion extending from said actuator in a direction that is perpendicular to said first and second directions, and being received slidably within said slide slot in said driven plate, said second driving portion extending from said actuator in said second direction, said driving member including a push plate formed with a middle hole that divides said push plate into a first plate portion and a second plate portion, and a pivot pin that extends through said middle hole in said push plate so as to mount said push plate rotatably on said lid, the movement of said unlatching member on said lid in said second direction causing said second driving portion of said unlatching member to engage and rotate said first plate portion of said push plate so that said second plate portion of said push plate engages and moves said tongue of said driven plate in said first direction.

3. The portable computer as claimed in claim 2, wherein said lid includes a positioning spring which biases said unlatching member to a predetermined position on said lid.

4. The portable computer as claimed in claim 1, wherein said driven plate has a left projection which constitutes said first engagement portion, and a right projection which define a slide slot between said left and right projections and which is formed with a first racked portion that constitutes said second engagement portion, said unlatching member having an actuator that is exposed outwardly from said lid and that is adapted to be pushed by a user, said first driving portion extending from said actuator in a direction that is perpendicular to said first and second directions, and being received slidably within said slide slot in said driven plate, said second driving portion extending from said actuator in said second direction and being formed with a second racked portion, said driving member including a pinion which is disposed rotatably on said lid and which engages said first racked portion of said driven plate, said pinion being spaced apart from said second racked portion of said unlatching member, the movement of said unlatching member on said lid in said second direction causing said second racked portion of said unlatching member to engage and rotate said pinion so that said pinion moves said first racked portion of said driven plate in said first direction.

5. The portable computer as claimed in claim 4, wherein said lid includes a positioning spring which biases said unlatching member to a predetermined position on said lid.

* * * * *